US011022239B1

(12) United States Patent
Faison

(10) Patent No.: US 11,022,239 B1
(45) Date of Patent: Jun. 1, 2021

(54) PRESSURE LOCKING HOSE

(71) Applicant: Vann Stone Faison, Seattle, WA (US)

(72) Inventor: Vann Stone Faison, Seattle, WA (US)

( * ) Notice: Subject to any disclaimer, the term of this patent is extended or adjusted under 35 U.S.C. 154(b) by 0 days.

(21) Appl. No.: 16/946,024

(22) Filed: Jun. 3, 2020

(51) Int. Cl.
| F16L 11/00 | (2006.01) |
| F16L 11/14 | (2006.01) |
| F16L 3/202 | (2006.01) |
| F16L 3/12 | (2006.01) |
| F16L 3/10 | (2006.01) |

(52) U.S. Cl.
CPC ............... F16L 11/14 (2013.01); F16L 3/10 (2013.01); F16L 3/1215 (2013.01); F16L 3/202 (2013.01)

(58) Field of Classification Search
CPC .................................. F16L 11/08; F16L 11/10
USPC .......... 248/75, 89, 91, 92, 93; 238/106, 118, 238/119
See application file for complete search history.

(56) References Cited

U.S. PATENT DOCUMENTS

| 4,739,801 A * | 4/1988 | Kimura | F16G 13/10 138/120 |
| 8,936,046 B2 * | 1/2015 | Ragner | F16L 11/005 138/119 |
| 2012/0304447 A1 * | 12/2012 | Smith | F16L 1/123 29/434 |
| 2014/0150889 A1 * | 6/2014 | Ragner | F16L 11/12 137/14 |
| 2014/0259620 A1 * | 9/2014 | Hicks | F16L 3/223 29/525.01 |
| 2016/0121078 A1 * | 5/2016 | Anderson | A61M 25/005 604/510 |
| 2019/0003267 A1 * | 1/2019 | Thomas | E21B 23/14 |

* cited by examiner

Primary Examiner — Steven M Marsh

(57) ABSTRACT

The present application discloses a hose that uses pressure to lock itself into a fixed position. The basic structure may comprise an internal flexible tube which contains a fluid and a mechanical exoskeleton. The mechanical exoskeleton may move freely without pressure, but may lock into place once the tube is pressurized.

16 Claims, 8 Drawing Sheets

PRESSURE LOCKING HOSE

TECHNICAL FIELD

The present application relates to a fluid supply or pressure or vacuum hose. More specifically, the present application relates to a flexible hose with a locking mechanism to fix it in place.

BACKGROUND

Hydraulic, pneumatic, vacuum and supply lines may be flexible hoses or hard lines depending on the application. Certain hose applications require some amount of flexibility. Some of these applications may include dryer vent ducts, sink faucets with internal flexible spray hoses, shower wands, semi-rigid sink faucets, pneumatic assembly line hoses, and dental and medical use hoses. Shortcomings of these systems include insufficient flexibility, insufficient rigidity, degradation of rigidity over time, or degradation of flexibility over time. The present application solves many of these issues.

SUMMARY OF THE INVENTION

The present application discloses a hose that uses pressure to lock itself into a fixed position. With a change in pressure, the hose may become flexible. The hose may be used hydraulic or pneumatic, for pressure or vacuum, or it may be a fluid supply line. The basic structure may comprise an internal flexible tube which contains a fluid and a mechanical exoskeleton. The mechanical exoskeleton may move freely along at least one axis without pressure, but may lock into place once the tube is pressurized.

DETAILED DESCRIPTION

Figure 1:
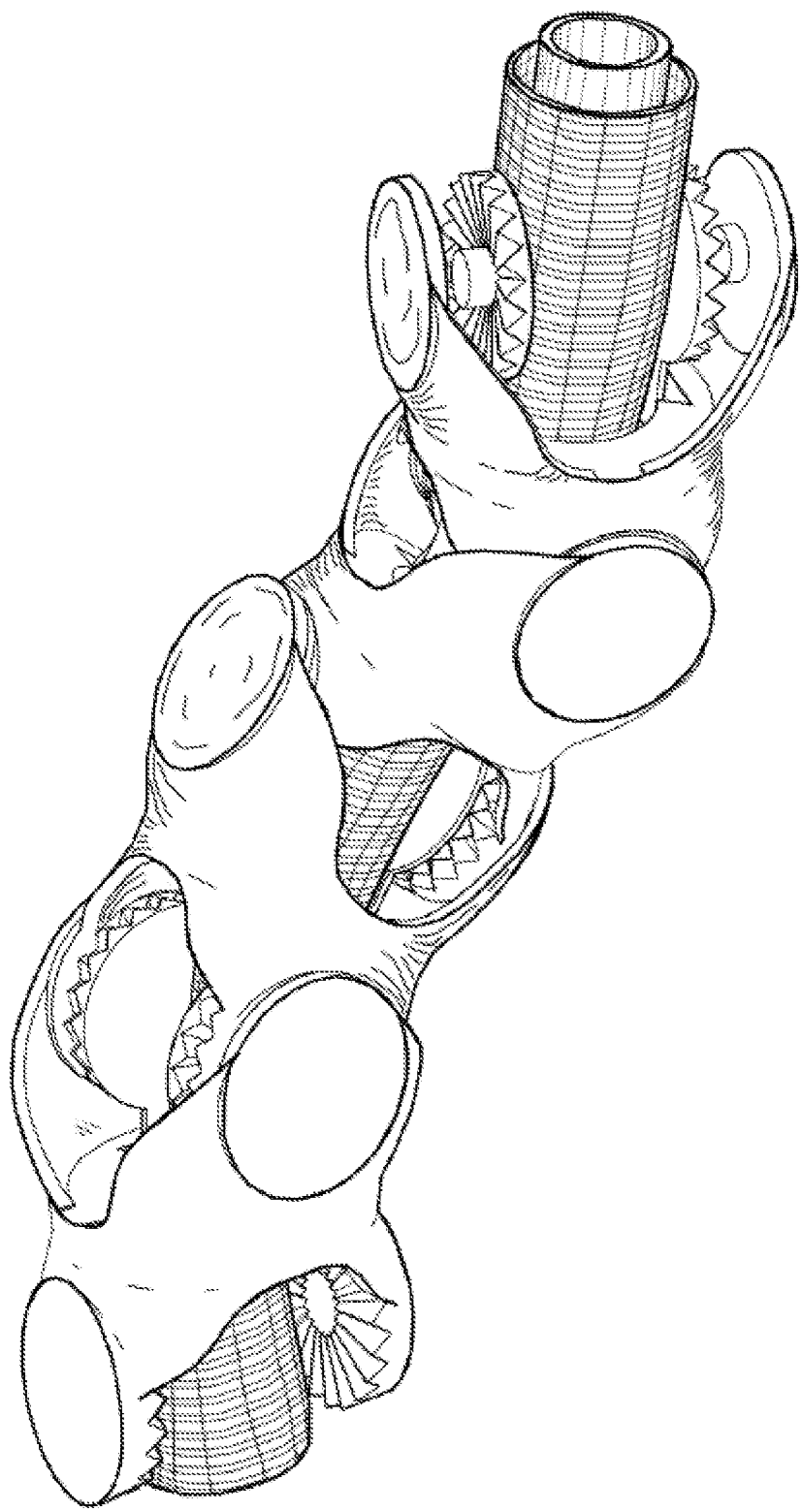
FIG. 1 is an unlabeled perspective view of the Pressure Locking Hose.

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limits include both numbers. For example, "25 to 100" means a range whose lower limit is 25 and upper limit is 100, and includes both 25 and 100.

The present application discloses a hose that uses pressure to lock itself into a fixed position. Certain tasks that a user may perform may require a pressure or supply hose that can be adjusted to, and be maintained in, a unique location or position. For example, a pneumatic tool on an assembly line may need to be accessed at several positions. A hose that may be moved and fixed to several positions quickly by the user may be advantageous over a pneumatic tool that hangs from a spring. With the present invention, an assembly line worker could change the pressure of the hose, reconfigure it, and change the pressure to lock it in place.

Similarly, a dishwasher in a restaurant might find a hose locked into certain positions advantageous as different dishes are presented. Another employee might choose a different set of positions. A dishwasher could easily shut off the pressure to the hose and reconfigure it however the user needs.

Figure 2:
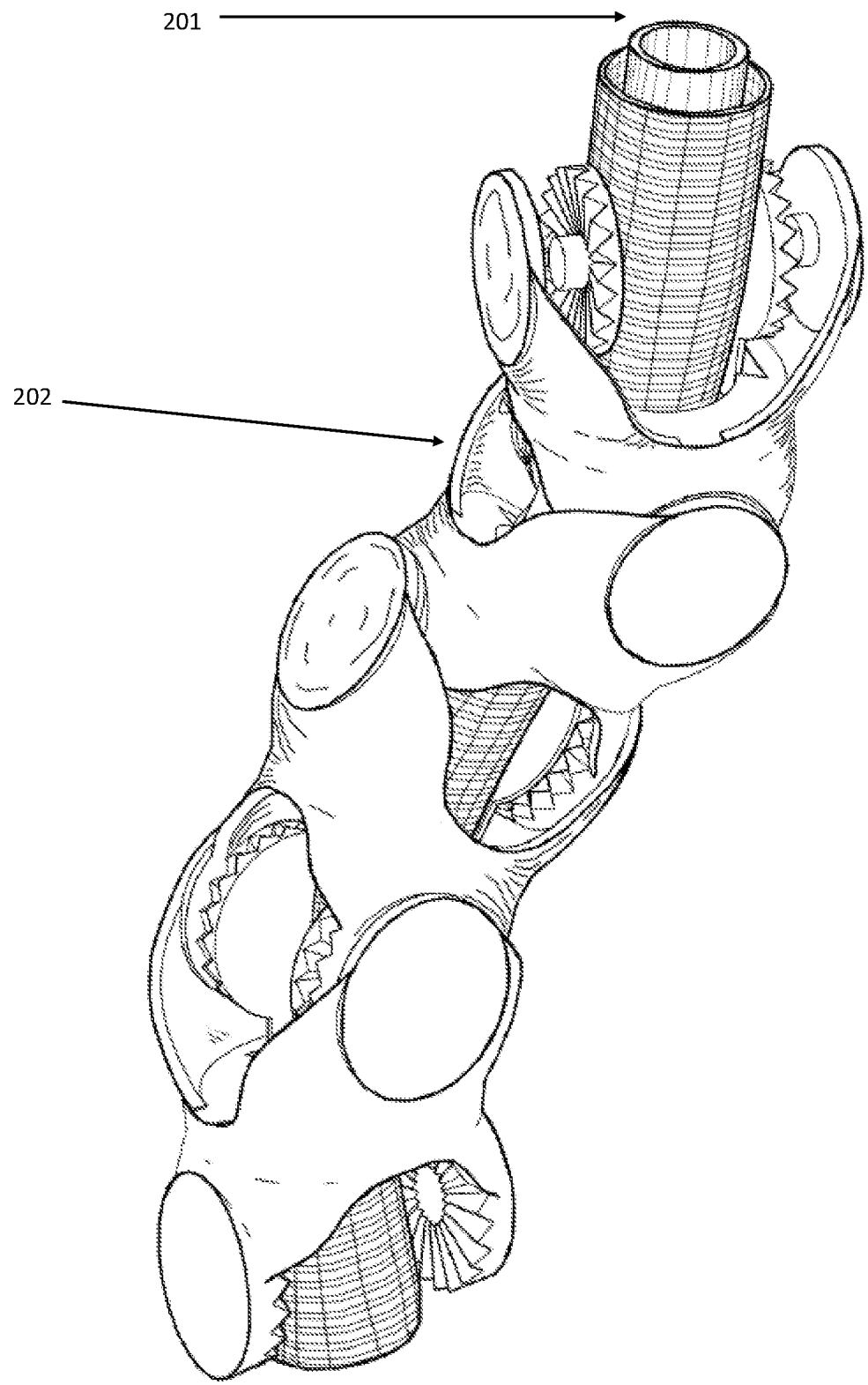
FIG. 2 is a labeled perspective view of the Pressure Locking Hose.

The present application discloses a hose that uses pressure or vacuum to lock itself into a fixed position. With a change in pressure, the hose may be flexible. The hose may be hydraulic or pneumatic, for pressure or vacuum, or it may be a fluid supply line. The basic structure may comprise an internal fluid tube, shown on FIG. 2 as 201, which contains the fluid and a mechanical exoskeleton, 202. The mechanical exoskeleton may move freely along at least one axis at a certain pressure, but may lock into place when the fluid tube has a change in pressure from the initial pressure. In some embodiments, the hose assembly may be locked and/or unlocked into place at a portion of or the entirety of the hose by pressurizing or depressurizing at the hose's terminus. In other embodiments, the change of pressure may be initiated from a point along the body of the hose or at the termini.

Figure 3:
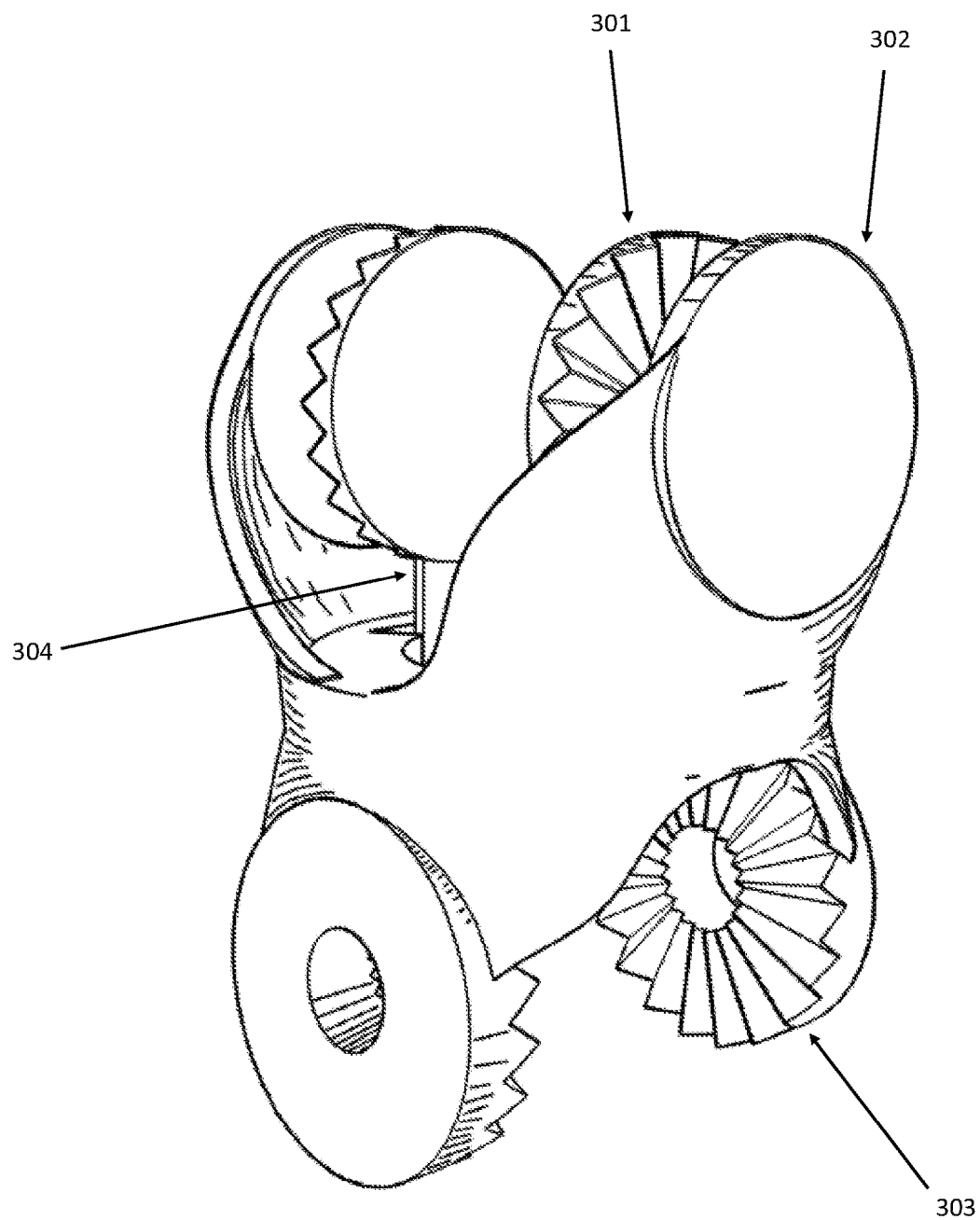
FIG. 3 is a perspective view of an individual ratchet segment of a Pressure Locking Hose.

The mechanical exoskeleton mechanism may be achieved by a chain of ratchet segments, shown in FIG. 3, with internal space to allow a fluid tube to pass through. In a pressure locking embodiment, a ratchet segment may lock to the adjacent segment when the fluid tube is pressurized. A chain of ratchet segments like the one shown in FIG. 3 may fit together so that the bottom side of one segment, 303, fits between structures 301 and 302 on the top side of the adjacent segment. The connected ratchet segments may then form a complete ratchet joint. The joint may be secured by a ratchet disc, 301, pushed outward from the fluid tube (not shown in FIG. 3) against structure 303 of the next segment of the chain. The ratchet disc, 301, may be connected to its own ratchet segment such that it may not rotate freely, but may rotate freely of the adjacent segment until pressure is applied. In FIG. 3, a flexible tab, 304, connects the ratchet disc with its ratchet segment to prevent it from rotating freely. A series of ratchet segments comprising the exoskeleton may effectively lock the entire hose assembly in place.

Figure 4:
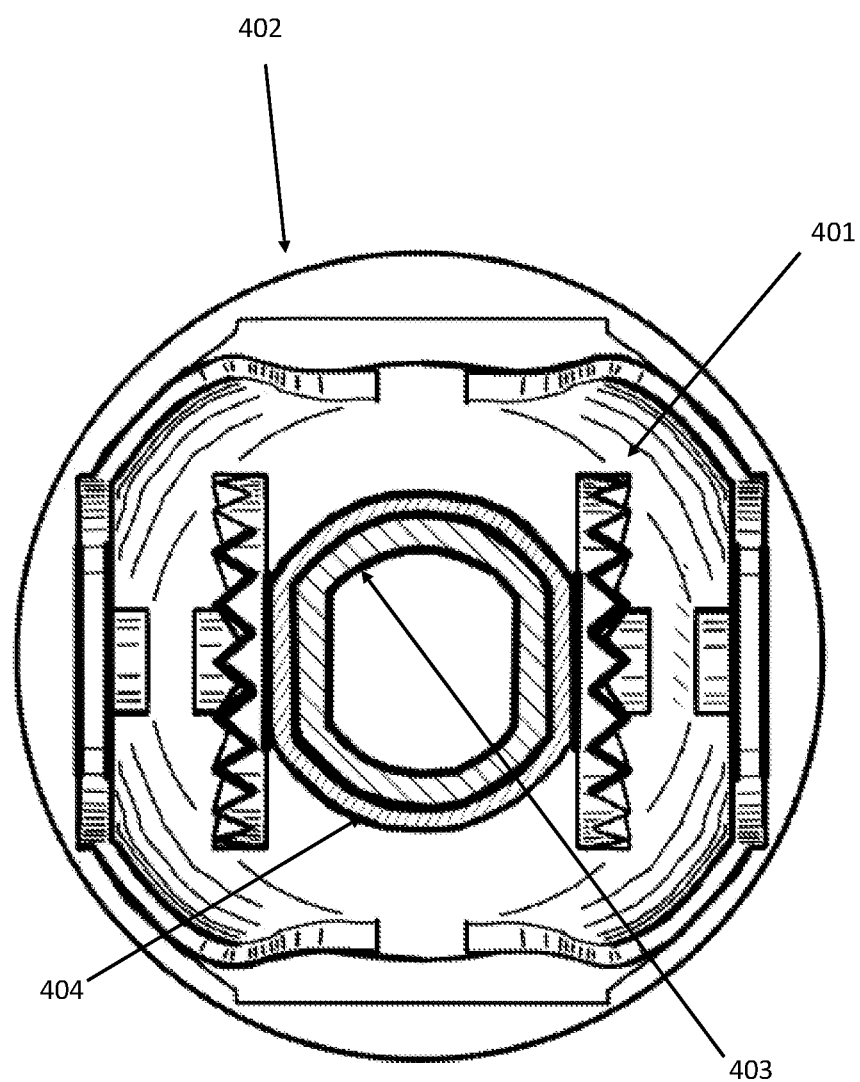
FIG. 4 is a cross-sectional view of the inside of a Pressure Locking Hose.

A cross-sectional view in FIG. 4 shows the ratchet discs labeled as 401. The fluid tube is shown as 403. The fluid tube may have a sleeve, 404, surrounding it within the chain of the mechanical exoskeleton. This sleeve may allow for a certain amount of growth to be achieved by the tube. The fluid tube may be restricted when it reaches the extents of the sleeve. An outer sleeve is also shown in this embodiment as 402.

Figure 5:
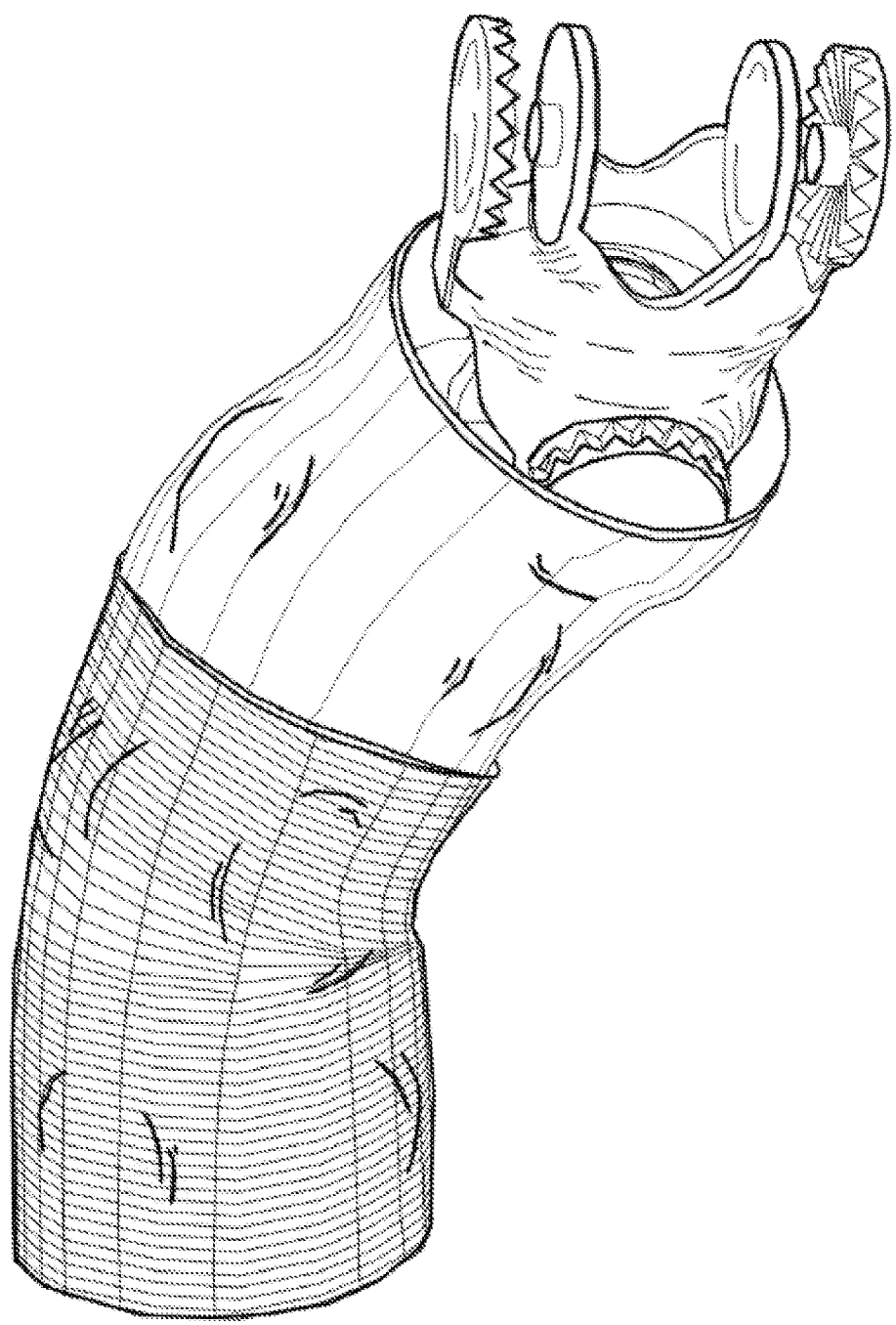
FIG. 5 is a perspective view of an embodiment of the invention with an endoskeleton.
Figure 6:
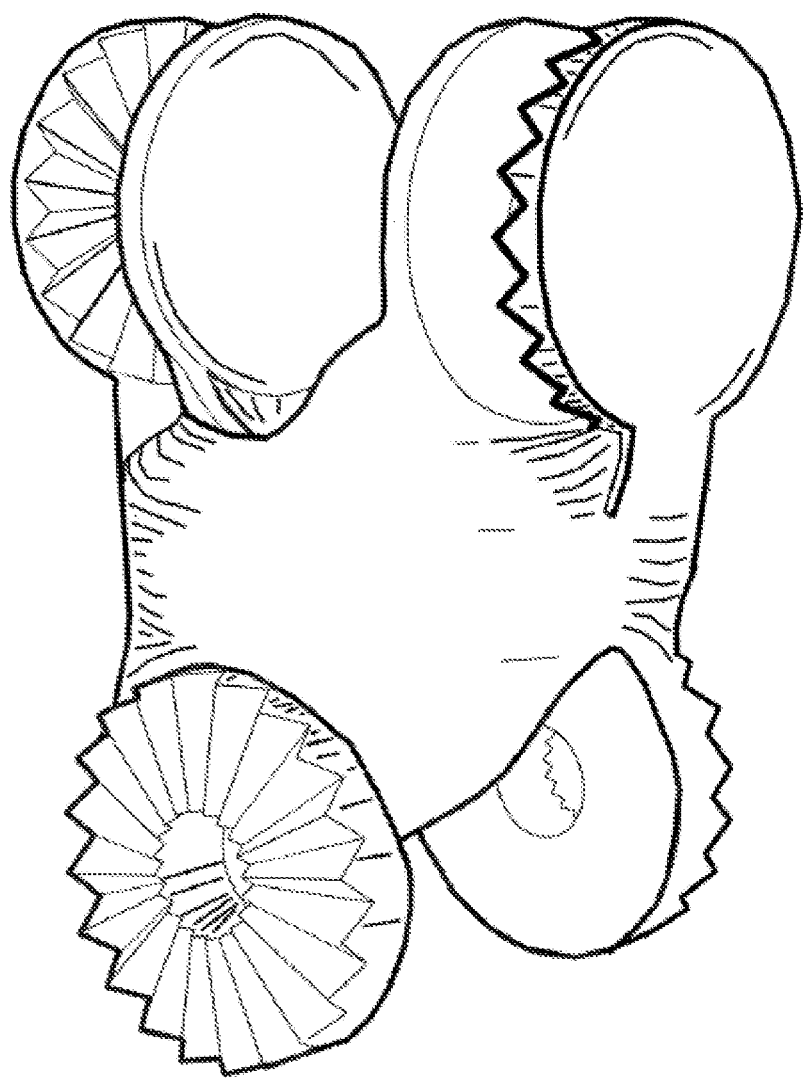
FIG. 6 is a perspective view of a ratchet segment of the invention with an endoskeleton.
Figure 7:
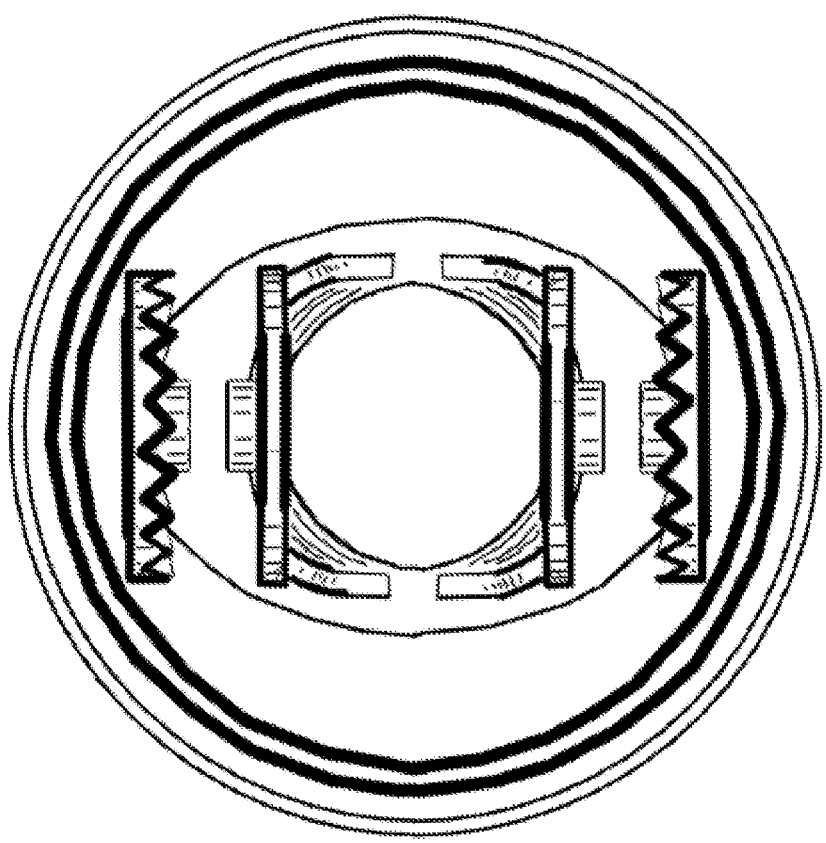
FIG. 7 is a cross-sectional view of a vacuum locking embodiment of the invention.

In some embodiments, the mechanical exoskeleton may alternatively be a mechanical endoskeleton, inside the fluid tube. This embodiment is shown in FIG. 5. A cross-section of this embodiment is shown in FIG. 7. Negative pressure may lock the endoskeleton by reducing the volume of the fluid tube and actuating the locking mechanism on the endoskeleton in a similar fashion to the pressure hose and exoskeleton system. In this system, the ratchet discs may be on the outside of the ratchet segments, so as to be pressed in to lock by the surrounding vacuum hose. These ratchet segments are shown in FIG. 6. The ratchet segments in FIG. 3, in comparison, have ratchet discs on the inside.

In some embodiments, a mechanical endoskeleton may be actuated by pressure. This embodiment would be very similar to that shown in FIG. 5, where the ratchet disc is on the outside of the ratchet joint. A fluid tube may be the space between at least two layers of tubing surrounded by a sheath. In this embodiment, pressure may be conveyed between the layers of tubing, which may expand when pressurized to lock ratchet discs to ratchet joints.

In other embodiments, rather than the use of a ratchet joint, high friction materials may be used. For example, two discs may have rubber contact surfaces, and when pressed together with vacuum or pressure, they made sufficiently hold a hose in position. Other materials could be aluminum, polystyrene, rubber, steel, plexiglass, or any other suitable material. These materials could comprise either or both components of a joint.

In another embodiment, a vacuum tube may be inside a mechanical exoskeleton. The tube may be connected to one or more components of the locking mechanism to allow for it to effectively pull on the locking mechanisms from its position within the exoskeleton (rather than surrounding it and constricting it). The ratchet segment may have ratchet disc that locks to the on the outside of the exoskeleton such as in FIG. 6 rather than FIG. 3. The ratchet discs may be anchored to the opposite side of the fluid tube so that when the tube shrinks, the tube may pull on the ratchet disc to lock the ratchet joint.

Figure 8:
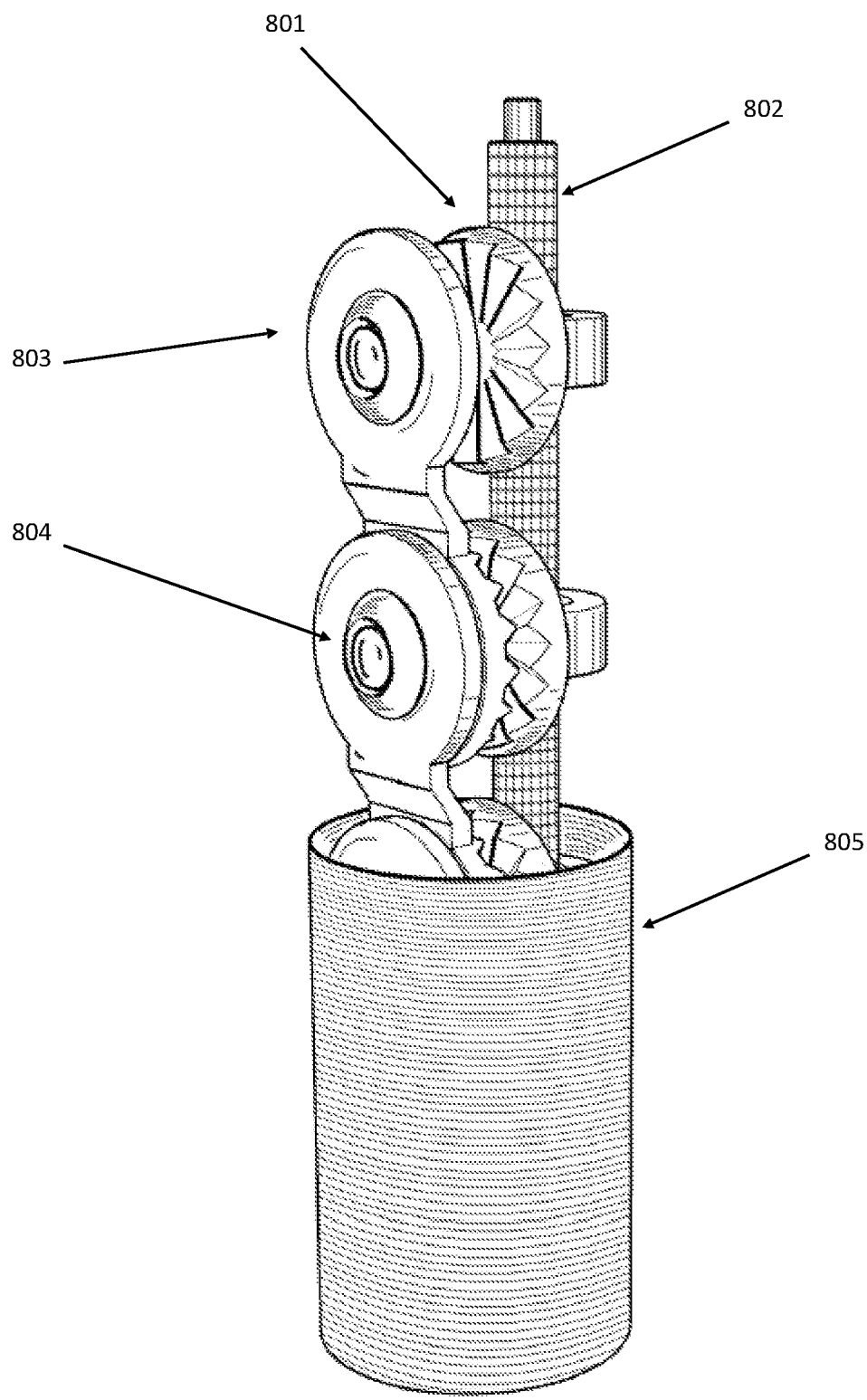
FIG. 8 is perspective view of an embodiment of the invention with an adjacent exoskeleton.

In another embodiment, the mechanical exoskeleton may be positioned adjacent to the tube. In this embodiment, shown in FIG. 8, ratchet discs, 801, are attached by rings to the fluid tube, 802. The ratchet discs are attached to the ratchet joint, 803, with a pin, 804, through their centers. The pin allows the ratchet disc to disengage from the ratchet joint, but holds the disc in place so that it may re-engage when pressure is applied to the fluid tube. The ratchet disc may spin freely of the ratchet joint, but may not spin freely of the fluid tube. When pressure is applied, the expansion of the fluid tube against a sheath, 805, may lock the ratchet joint. The assembly is locked into place because the ratchet joints have assumed a fixed angle in relation to each adjacent ratchet joint. When the pressure is removed from the fluid tube, the ratchet discs may allow the hose flexibility because the ratchet discs are allowed to rotate freely.

In a negative pressure adjacent skeleton embodiment, where the fluid tube is shrinking, the tube may be connected by tethers to the ratchet joints to allow for the fluid tube to effectively pull on the mechanism in order to lock it in place.

The invention claimed is:

1. A hose which transitions between an unlocked state and a locked state when pressure is applied, wherein said unlocked state allows for said hose to rotate freely along at least one axis, and said locked state maintains said hose in a fixed position, said hose comprising:
    a fluid tube;
    a locking mechanism surrounding said fluid tube or surrounded by said fluid tube, said locking mechanism being actuated by expansion of said fluid tube caused by an increase in pressure or a decrease in pressure, or said locking mechanism being actuated by compression of said fluid tube caused by an increase in pressure or a decrease in pressure;
    whereby at least one segment of the locking mechanism locks to an adjacent segment when said pressure is applied.

2. A hose which transitions between an unlocked state and a locked state when vacuum is applied, wherein said unlocked state allows for said hose to rotate freely along at least one axis, and said locked state maintains said hose in a fixed position, said hose comprising:
    a fluid tube;
    a locking mechanism surrounding said fluid tube or surrounded by said fluid tube, said locking mechanism being actuated by expansion of said fluid tube caused by an increase in pressure or a decrease in pressure, or said locking mechanism being actuated by compression of said fluid tube caused by an increase in pressure or a decrease in pressure;
    whereby at least one segment of the locking mechanism locks to an adjacent segment when said pressure is applied.

3. The hose of claim 1 wherein a change of pressure may be initiated at a hose termini.

4. The hose of claim 2 wherein a change of pressure may be initiated at a hose termini.

5. The hose of claim 1 wherein a change of pressure may be initiated at a point along a body of the hose.

6. The hose of claim 2 wherein a change of pressure may be initiated at a point along a body of the hose.

7. The hose of claim 1 wherein the hose may contain high friction materials selected from a group comprising: aluminum, polystyrene, rubber, steel, plexiglass, or any other suitable material.

8. The hose of claim 2 wherein the hose may contain high friction materials selected from a group comprising: aluminum, polystyrene, rubber, steel, plexiglass, or any other suitable material.

9. The hose of claim 1 wherein the fluid tube is a space between at least two layers of tubing surrounded by a sheath.

10. The hose of claim 2 wherein the fluid tube is a space between at least two layers of tubing surrounded by a sheath.

11. The hose of claim 1 wherein the locking mechanism comprises a mechanical exoskeleton.

12. The hose of claim 2 wherein the locking mechanism comprises a mechanical exoskeleton.

13. The hose of claim 1 wherein said hose has an outer sleeve.

14. The hose of claim 2 wherein said hose has an outer sleeve.

15. The fluid tube of claim 1 wherein tethers are attached from said fluid tube to said locking mechanism.

16. The fluid tube of claim 2 wherein tethers are attached from said fluid tube to said locking mechanism.

\* \* \* \* \*